(12) United States Patent
Honda et al.

(10) Patent No.: US 6,430,353 B1
(45) Date of Patent: Aug. 6, 2002

(54) AUDIO AND VIDEO REPRODUCING APPARATUS HAVING INDEPENDENT CONTROL OF SELECTED SIGNALS

(75) Inventors: Susumu Honda; Tetsuo Yuga, both of Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 07/667,624

(22) Filed: Mar. 11, 1991

(30) Foreign Application Priority Data

Mar. 20, 1990 (JP) .............................................. 2-71554

(51) Int. Cl.⁷ ............................ H04N 5/76; H04N 5/268
(52) U.S. Cl. ............................ 386/46; 348/705; 381/81
(58) Field of Search ................................. 358/335, 181, 358/184, 185, 198; 381/81, 85, 119, 53, 24, 25, 28, 86, 10; 455/56, 55, 140, 3.1, 4.1, 4.2; 369/1, 2, 3, 4, 19; 340/825.5; 386/46, 96; 348/705

(56) References Cited

U.S. PATENT DOCUMENTS

| | | | | |
|---|---|---|---|---|
| 2,110,358 A | * | 3/1938 | Dreisbach | 381/85 |
| 3,889,051 A | * | 6/1975 | Legler | 358/185 |
| 4,037,250 A | * | 7/1977 | McGahan et al. | 358/181 |
| 4,164,625 A | * | 8/1979 | Igeta | 381/86 |
| 4,257,067 A | * | 3/1981 | Christopher | 358/198 |
| 4,347,510 A | * | 8/1982 | Techigaki et al. | 381/85 |
| 4,525,820 A | * | 6/1985 | Enoki et al. | 381/81 |
| 4,549,179 A | * | 10/1985 | Stendardo | 381/85 |
| 4,763,012 A | * | 8/1988 | Blankinship | 358/181 |
| 4,953,213 A | * | 8/1990 | Tasaki et al. | 381/24 |
| 4,964,108 A | * | 10/1990 | Ohtsu et al. | 369/19 |
| 4,979,217 A | * | 12/1990 | Shipley | 381/81 |
| 5,034,808 A | * | 7/1991 | Murray | 381/85 |
| 5,073,944 A | * | 12/1991 | Hirasa | 381/86 |
| 5,179,719 A | * | 1/1993 | Hidaka | 455/140 |
| 5,182,552 A | * | 1/1993 | Paynting | 340/825.25 |
| 5,287,547 A | * | 2/1994 | Hidaka | 381/11 |

* cited by examiner

Primary Examiner—Huy Nguyen
(74) Attorney, Agent, or Firm—Rader, Fishman & Grauer PLLC; Ronald P. Kananen, Esq.

(57) ABSTRACT

An audio reproducing apparatus including first and second audio signal transmission paths each applied with a plurality of audio signals. Each of the first and second audio signal transmission paths has a selector for selecting one of the plurality of audio signals supplied thereto and a level controller for controlling the level of the selected audio signal. The first and second audio signal transmission paths are connected to first and second speaker units respectively each for converting the audio signal selected by the corresponding selector and whose level is controlled by the corresponding level controller into acoustic power.

25 Claims, 3 Drawing Sheets

AUDIO AND VIDEO REPRODUCING APPARATUS HAVING INDEPENDENT CONTROL OF SELECTED SIGNALS

BACKGROUND OF THE INVENTION

1. Field of the Invention

The present invention relates to an audio reproducing apparatus and more particularly to an audio reproducing apparatus of a type having a plurality of speaker output terminals and a switch for selectively applying an audio signal thereto.

2. Description of the Prior Art

It has been proposed in the art to have an audio reproducing apparatus so constructed that a change-over switch and two speaker output terminals are provided. An output signal of a main amplifier thereof is applicable to a speaker (s) disposed in a first room through one of the speaker output terminals or to a speaker(s) disposed in a second room through the other speaker output terminal selectively by the switch or applicable to the speakers in both the first and second rooms simultaneously.

However, in this conventional apparatus, since the output signal of the main amplifier is selectively applied to one of the speakers or both the speakers simultaneously in the first and second rooms, listeners in the first and second rooms cannot listen to different program or sound sources and further the sound volume of each of the speakers in both rooms becomes the same.

OBJECTS AND SUMMARY OF THE INVENTION

Accordingly, it is a general object of the present invention to provide an improved audio reproducing apparatus in which the aforementioned shortcomings and disadvantages of the prior art can be eliminated.

More specifically, it is an object of the present invention to provide an improved audio reproducing apparatus which is capable of supplying audio signals of different program sources to a plurality of speaker output terminals and further capable of adjusting the volume of the audio signals supplied to the output terminals independently.

According to an aspect of the present invention, an audio reproducing apparatus is comprised of a first audio signal transmission path to which a plurality of audio signals are supplied, a second audio signal transmission path to which the plurality of audio signals are supplied, transmitting circuits, first and second input selectors provided on the first and second audio signal transmission paths respectively each for selecting one of the plurality of audio signals applied to the corresponding path, first and second level controllers provided on the first and second audio signal transmission paths respectively each for controlling a level of the selected audio signal by the corresponding input selector, and first and second speaker units connected to the first and second audio signal transmission paths respectively each for receiving the selected audio signal.

The above and other objects, features, and advantages of the present invention will become apparent from the following detailed description of an illustrative embodiment thereof to be read in conjunction with the accompanying drawings, in which like reference numerals represent the same or similar parts and elements.

DETAILED DESCRIPTION OF THE PREFERRED EMBODIMENT

An embodiment of the present invention will now be described by way of example and with reference to the accompanying drawings.

Figure 1A:
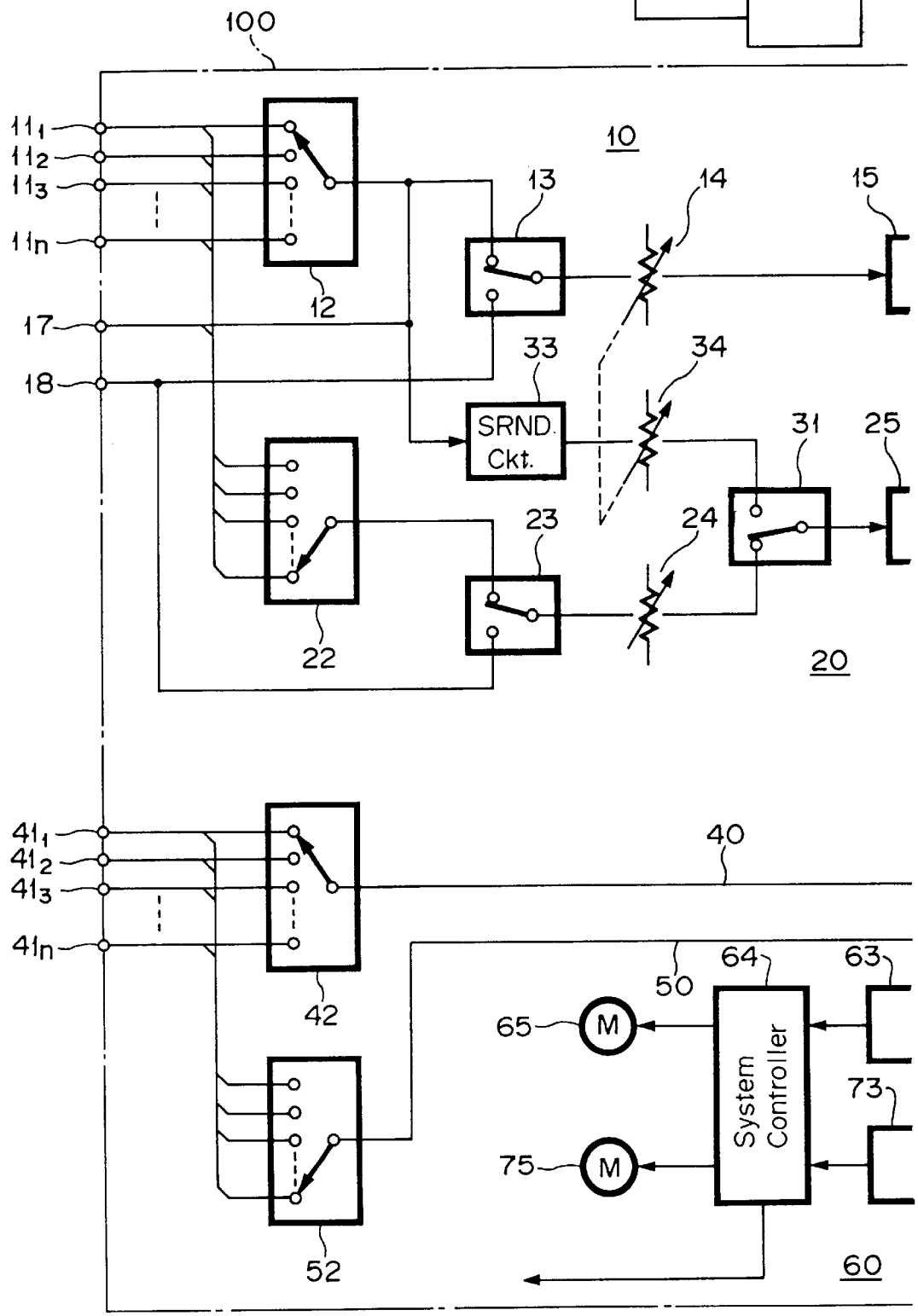
FIG. 1 is a systematic block diagram illustrating the construction of an embodiment of the audio reproducing apparatus according to the present invention.
Figure 1B:
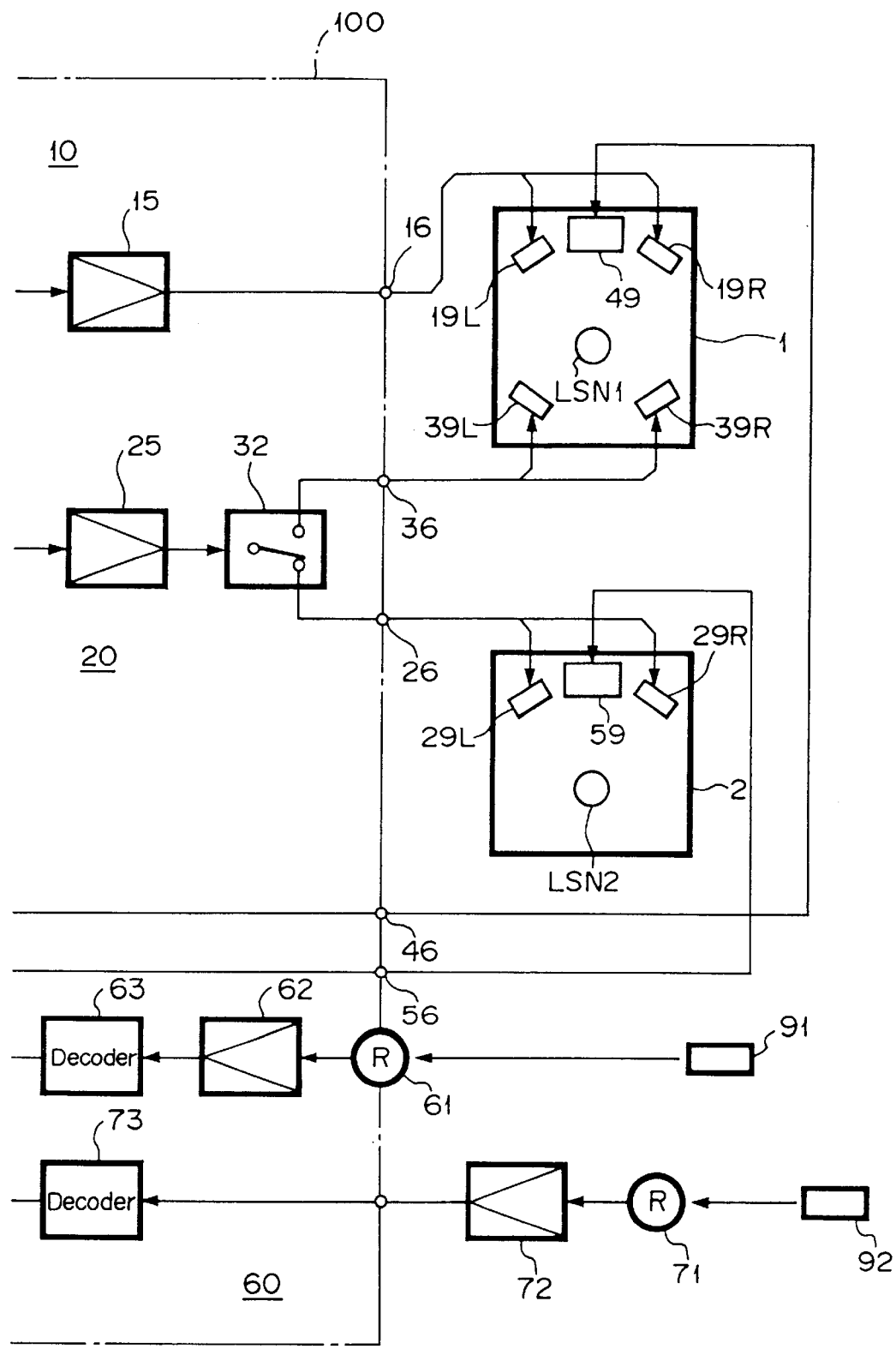

Referring to the drawings, FIG. 1 (formed of FIGS. 1A and 1B drawn on two sheets of drawings so as to permit the use of a suitably large scale) is a block diagram illustrating the construction of an embodiment of the audio reproducing apparatus according to the present invention.

The embodiment of the audio reproducing apparatus shown in FIG. 1 is exemplarily constructed so that the surround stereo sound system is provided in a first room 1 while a video signal can be reproduced and viewed by a video display device; such as a CRT (cathode ray tube) display device, independently in each of the first room 1 and a second room 2.

Now, each of first and second audio signal transmission lines 10 and 20 shown in FIG. 1 has two lines for transmitting both audio signals of right and left channels respectively although only one line for transmitting one of the channels is shown in FIG. 1 merely to simplify the drawing. Therefore the explanation of this embodiment hereinafter will be made about one of the channels.

In FIG. 1, audio signals are respectively applied to first to n'th audio signal input terminals $11_1$–$11_n$, from audio devices such as an FM (frequency modulation) tuner(s), a satellite broadcasting tuner(s), a CD (compact disk) player (s) and a video disk player(s) or the like. One of the audio signals received at the input terminals $11_1$–$11_n$ is selected by a switch circuit 12 for input selection. Then, the selected audio signal is applied to a stationary contact of a program source side of a switch circuit 13 for monitor selection through the first audio signal transmission line 10 on one hand and also applied to an output terminal 17 for recording on the other hand. A reproduced audio signal applied to a tape input terminal 18 from a cassette tape recorder or tape deck (not shown) is applied to a stationary contact of a tape recorder side of the switch circuit 13. The audio signal selected by the switch circuit 13 is transmitted through a variable resistor 14 for volume or level control and a power amplifier 15 on the line 10 and applied to an output terminal 16 to thereby be applied to a speaker 19L for a left channel or a speaker 19R for a right channel.

Figure 2:
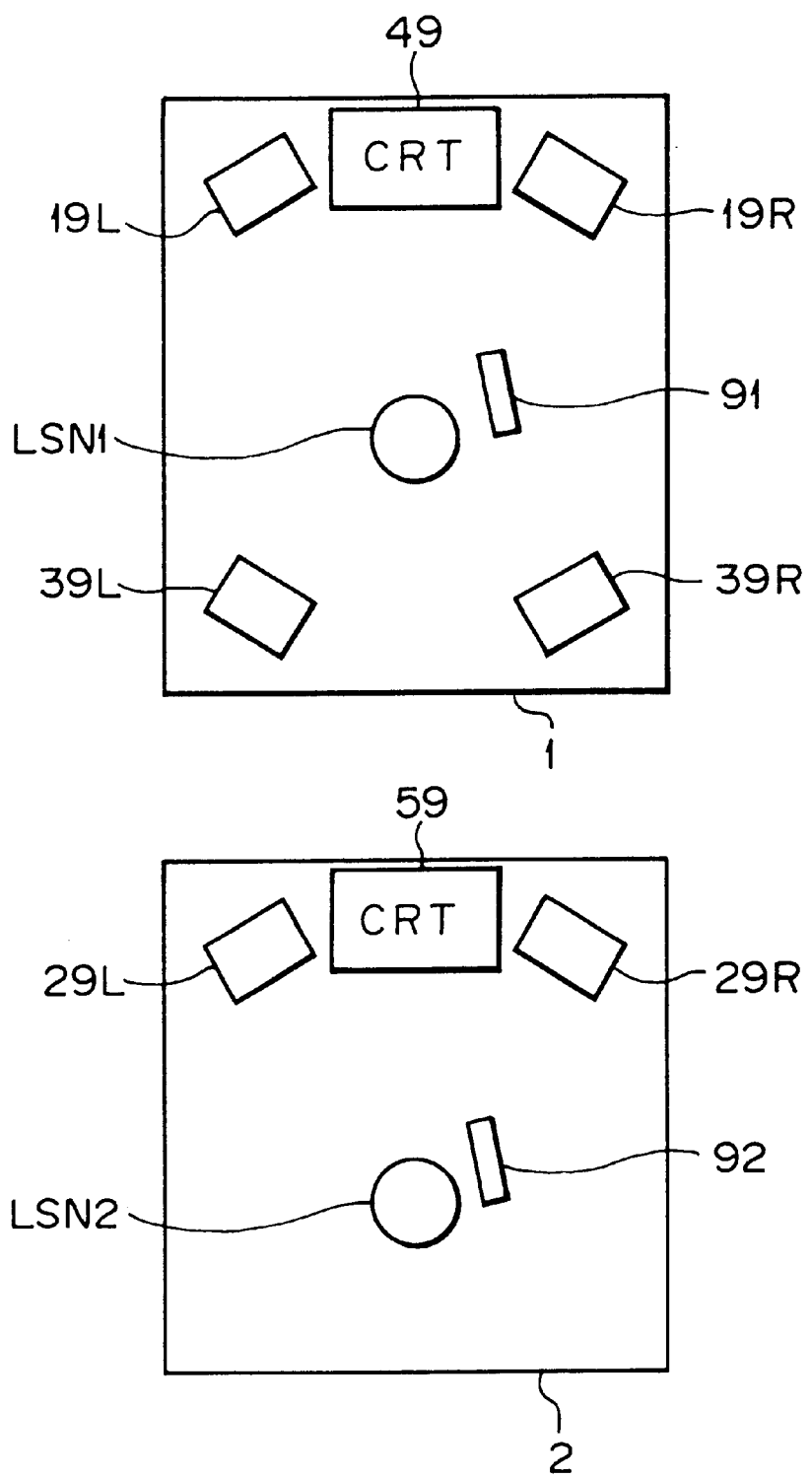
FIG. 2 is a plan view of rooms illustrating arrangement of audio and visual devices in the rooms in FIG. 1.

In this case, the speakers 19L and 19R are disposed in the first room 1. Namely, in the first room 1, the speakers 19L and 19R are disposed at the left and right sides in front of a listener LSN1 while speakers 39L and 39R are disposed at the left and right sides behind the listener LSN1, respectively, for example, as shown in FIG. 2. Further, a CRT display device 49 is disposed between the speakers 19L and 19R, for example.

The audio signals received at the input terminals $11_1$–$11_n$ are also applied to a switch circuit 22 for input selection and any one of the audio signals selected by the switch circuit 22 is applied to a switch circuit 23 for monitor selection on the second audio signal transmission line 20. The switch circuit 23 selects one of the audio signals applied from the switch circuit 22 and the input terminal 18 and then the selected audio signal is transmitted on the second audio signal transmission line 20 to an output terminal 26 through a variable resistor 24 for volume or level control, a switch circuit 31, a power amplifier 25 and a switch circuit 32. The audio signal delivered to the output terminal 26 is then applied to a speaker 29L for a left channel or a speaker 29R for a right channel which are disposed in the second room 2.

Namely, in the second room 2, the speakers 29L and 29R are disposed at the left and right sides in front of a listener LSN2 respectively and a CRT display device 59 is disposed between the speakers 29L and 29R, for example, as shown in FIG. 2.

The amplifier 25 also acts to amplify the audio signal to be applied to the rear speakers 39L and 39R through an output terminal 36 in case of realizing the surround stereo sound system in the first room 1. To this end, a surround processing circuit (SRND) 33 is provided in a manner that it extracts an audio signal of rear channels for the surround stereo sound on the basis of the selected audio signal from the switch circuit 12 and applies the extracted audio signal to the switch circuit 31 through a variable resistor 34 for volume or level control. The switch circuit 31 then selectively applies one of the audio signals from the variable resistors 34 and 24 to the amplifier 25.

Now, as will be described later, the switch circuit 31 is ganged with the switch circuit 32 in a manner that when the movable contact of the switch circuit 31 is changed over to the stationary contact of the variable resistor 34 side, in case of the reproduction of the surround stereo sound, the movable contact of the switch circuit 32 is changed over to the stationary contact of the output terminal 36 side. Thus, when the reproduction of the surround stereo sound is selected, the amplifier 25 amplifies the audio signal supplied from the variable resistor 34 and supplies the amplified audio signal to the rear speakers 39L and 39R through the switch circuit 32 and the output terminal 36.

Reproduced audio signals from such devices as a VTR(s) (video tape recorder) and a video disk player(s) etc. (not shown) are supplied to another set of first to n'th video signal input terminals $41_1$–$41_n$ and then applied to a switch circuit 42 for input selection. The switch circuit 42 then selects any one of the video signals received at the input terminals $41_1$–$41_n$ and applies the selected video signal to an output terminal 46 through a first video signal transmission line 40 to thereby apply it to the CRT display device 49.

The video signals received at the input terminals $41_1$–$41_n$ are also applied to a switch circuit 52 for input selection and any one of the video signals selected by the switch circuit 52 is applied to an output terminal 56 through a second video signal transmission line 50 to thereby apply it to the CRT display device 59. Now, the circuit configuration shown by a chain line block in FIG. 1 is installed as an audio reproducing apparatus 100 and disposed in the room 1.

An infrared transmitter 91 for remotely controlling the apparatus 100 is provided in order to select the input audio signal transmitted on the first audio signal transmission line 10 and the first video signal transmission line 40 and to control the volume of the selected audio signal. An infrared transmitter 92 for remotely controlling the apparatus 100 is also provided in order to select the input audio signal transmitted on the second audio signal transmission line 20 and the second video signal transmission line 50 and to control the volume of the selected audio signal. To this end, though not shown, each of the transmitters 91 and 92 has a key(s) for selecting the inputted audio signal and a key(s) for controlling the volume of the selected audio signal. If the key of each of the transmitters is operated, each transmitter generates data DT for performing the control associated with the operated key and radiates the infrared ray subjected to the pulse modulation by the data DT.

A receiver 60 receives the infrared rays radiated from the transmitters 91 and 92 by its photo sensors 61 and 71, respectively. The photo sensors 61 and 71 convert the received infrared rays into remote control signals to apply them to amplifiers 62 and 72 for wave-shaping, respectively.

In this case, the photo sensor 71 and the amplifier 72 are disposed in the second room 2, but the photo sensor 61 and the amplifier 62 and the succeeding stages of the amplifiers 62 and 72 are located integrally with the audio reproducing apparatus 100.

The remote control signals from the amplifiers 62 and 72 are applied to decoders 63 and 73 respectively to thereby decode the adjusting item of the data DT. The decoded data DT from the decoders 63 and 73 are applied to a system controller 64 having a microcomputer to thereby form control signals associated with the operated keys of the transmitters 91 and 92, respectively. The control signals from the system controller 64 are applied to the switch circuits 12, 13, 22, 23, 31, 32, 42 and 52 to thereby control them. In this case, a pair of the switch circuits 12 and 42, a pair of the switch circuits 22 and 52, and a pair of the switch circuits 31 and 32, are respectively changed over in a ganged manner. The control signals from the system controller 64 are also applied to motors 65 and 75. The motor 65 cooperatively controls the variable resistors 14 and 34 in a ganged relation while the motor 75 controls the variable resistor 24.

In this construction, if the key of the transmitter 91 is operated, the infrared rays modulated by the data DT corresponding to the operated key are transmitted and received by the photo sensor 61, which in turn converts the infrared rays to the remote control signal and applies the same to the system controller 64 through the amplifier 62 and the decoder 63. The system controller 64 then generates the control signal corresponding to the operated key to thereby control the switch circuits 12, 13, 31, 32 and 42 and the variable resistors 14 and 34 on the first audio and video signal transmission lines 10 and 40.

Thus, the listener LSN1 in the first room 1 can not only select any one of the program sources applied to the input terminals $11_1$–$11_n$, 18 and $41_1$–$41_n$ but also control the volume of the selected program source by operating the key of the transmitter 91. The listener LSN1 in the first room 1 also can select the surround stereo sound by operating the switch circuits 31 and 32 so as to drive the rear speakers 39L and 39R by the extracted audio signals of the rear sound.

Also, if the key of the transmitter 92 is operated, the infrared rays modulated by the data DT corresponding to the operated key is transmitted and received by the photo sensor 71, which in turn converts the infrared rays to the remote control signal and applies the same to the system controller 64 through the decoder 73. The system controller 64 then generates the control signal corresponding to the operated key to thereby control the switch circuits 22, 23, 31, 32 and 52 and the variable resistor 24 on the second audio and video signal transmission lines 20 and 50.

Thus, the listener LSN2 in the second room 2 can not only select any one of the program sources applied to the input terminals $11_1$–$11_n$, 18 and $41_1$–$41_n$ but also control the volume of the selected program source by operating the key of the transmitter 92.

Accordingly, in the present invention, the audio signal and also the video signal can be reproduced in each of the rooms 1 and 2. Further, for a plurality of program sources there are provided the first and second audio signal transmission lines 10 and 20, and the switch circuits 12 and 22 capable of selecting the program sources independently to each other and the variable resistors 14 and 24 for controlling the volume of the selected program source are provided on the audio signal transmission lines 10 and 20, respectively. Thus, by providing only one audio reproducing apparatus 100 according to the present invention, two listeners LSN1 and LSN2 can not only simultaneously and independently select the program source but also control independently the volume of the selected program source.

Further, the selection of the program source and the adjusting of the volume of the selected program source can be performed by the remote controller.

The main amplifier 25 acts not only as an amplifier for the rear channel of the surround stereo sound but also as an amplifier for the second room 2, so that there is no necessity of providing two amplifiers to thereby make the cost of the apparatus cheap.

Further, the video image can be reproduced simultaneously with the reproduction of the audio signal in a manner that different program sources can be viewed by the CRT display devices 49 and 59 since the plurality of program sources received at the input terminals $41_1$–$41_n$ are applied to the first and second video signal transmission lines 46 and 56 through the switch circuits 42 and 52.

Now, the above-described embodiment uses the electronic switches which are controlled by the control signal such as the switches 12, 13, 22, 23, 32, 42 and 52 but may instead use such mechanical switches as those rotated by motors driven by the control signals instead of the electronic switches. Further, such attenuators of electronic control type as those controlled by the control signals may be used instead of the variable resistors 14, 24 and 34.

Instead of the power amplifiers 15 and 25, buffer amplifiers may be used and other power amplifiers may be provided outside of the apparatus. Further, an amplifier of BTL connection may be provided instead of the amplifiers 15 and 25 in a manner that the amplifier acts as an amplifier for the room 1 or 2 when the listeners listen to the music etc. in the room 1 or 2 and the BTL connection amplifier is divided into two amplifiers 15 and 25 for the rooms 1 and 2 respectively when the listeners listen to the music etc. in both rooms simultaneously.

The apparatus may be modified so as to be able to adjust the DSP as well as the selection of the program sources and the adjusting of the volume.

Therefore, according to the present invention, the first and second audio signal transmission lines 10 and 20 are provided each for receiving the plurality of program sources, and on the lines 10 and 22, the switch circuits 12 and 22 are respectively provided for independently selecting the inputted program sources. Further the variable resistors 14 and 24 for controlling the volume of the selected sources are provided respectively, so that by providing only one audio reproducing apparatus 100 according to the present invention, two listeners LSN1 and LSN2 can not only simultaneously and independently select the program source but also control independently the volume of the selected program source.

Further, the selection of the program source and the adjusting of the volume of the selected program source can be performed by the remote controller.

The main amplifier 25 acts not only as an amplifier for the rear channel of the surround stereo sound but also as an amplifier for the second room 2, so that there is no necessity of providing two amplifiers to thereby make the cost of the apparatus cheap.

Further, the video image can be reproduced simultaneously with the reproduction of the audio signal in a manner that different program sources can be viewed by the CRT display devices 49 and 59 simultaneously.

Having described the preferred embodiment of the invention with reference to the accompanying drawings, it is to be understood that the invention is not limited to that precise embodiment and that various changes and modifications thereof could be effected by those skilled in the art without departing from the spirit or scope of the novel concepts of the invention as defined in the appended claims.

We claim:

1. A reproducing apparatus comprising:
    a plurality of input audio signal lines, an input audio signal line of said plurality of input audio signal lines supplying an input audio signal;
    a first input audio switch, said first audio switch receiving said plurality of input audio signal lines, said first audio switch selecting one of said plurality of input audio signal lines as a first intermediate audio signal;
    a second input audio switch, said second audio switch receiving said plurality of input audio signal lines, said second audio switch selecting one of said plurality of input audio signal lines as a second intermediate audio signal;
    a first intermediate audio switch, said first intermediate audio switch receiving said first intermediate audio signal and an input terminal signal, said first intermediate audio switch selecting one of said first intermediate audio signal and said input terminal signal as a first selected audio signal;
    a second intermediate audio switch, said second intermediate audio switch receiving said second intermediate audio signal and said input terminal signal, said second intermediate audio switch selecting one of said second intermediate audio signal and said input terminal signal as a second selected audio signal;
    at least one first audio transducer in a first location, a first audio transducer of said at least one first audio transducer converting said first selected audio signal into sound; and
    at least one second audio transducer in a second location, said second location being partitioned from said first location.

2. A reproducing apparatus according to claim 1, wherein said first intermediate audio signal is supplied to an output terminal.

3. A reproducing apparatus according to claim 1, further comprising:
    a first audio amplifier, said first audio amplifier amplifying said first selected audio signal and transmitting said first selected audio signal, as processed by said first audio amplifier, to said at least one first audio transducer.

4. A reproducing apparatus according to claim 1, wherein a second audio transducer of said at least one second audio transducer converts said second selected audio signal into sound.

5. A reproducing apparatus according to claim 1, wherein said first intermediate audio signal is supplied to a surround processing circuit, said surround processing circuit extracting a rear channel audio signal from said first intermediate audio signal.

6. A reproducing apparatus according to claim 1, further comprising:

a system controller, said system controller controlling:
said first audio switch to select said one of said plurality of input audio signal lines as said first intermediate audio signal;
said second audio switch to select said one of said plurality of input audio signal lines as said second intermediate audio signal;
said second audio switch to select said one of said plurality of input audio signal lines as a second intermediate audio signal;
said first intermediate audio switch to select said one of said first intermediate audio signal and said input terminal signal as said first selected audio signal; and
said second intermediate audio switch to select said one of said second intermediate audio signal and said input terminal signal as said second selected audio signal.

7. A reproducing apparatus according to claim 6, further comprising:
at least one remote controller, said at least one remote controller controlling said system controller, said first and second audio switches and said first and second intermediate audio switches being controlled in response to a control signal from said at least one remote controller.

8. A reproducing apparatus according to claim 7, wherein said at least one remote controller is in said first location.

9. A reproducing apparatus according to claim 7, wherein said at least one remote controller is in said second location.

10. A reproducing apparatus according to claim 7, wherein one said at least one remote controller is in said first location and another said at least one remote controller is in said second location.

11. A reproducing apparatus according to claim 7, wherein said control signal is an infrared signal.

12. A reproducing apparatus according to claim 1, further comprising:
a surround sound switch, said surround sound switch receiving said second selected audio signal and said rear channel audio signal, said surround sound switch selecting one of said second selected audio signal and said rear channel audio signal as a surround/second signal.

13. A reproducing apparatus according to claim 12, wherein another audio transducer of said at least one first audio transducer converting said surround/second signal into sound.

14. A reproducing apparatus according to claim 13, wherein said first audio transducer is positioned in front of a listener and said another audio transducer is positioned behind said listener.

15. A reproducing apparatus according to claim 13, wherein a second audio transducer of said at least one second audio transducer converts said surround/second signal into sound.

16. A reproducing apparatus according to claim 13, further comprising:
a second audio amplifier, said second audio amplifier amplifying said surround/second signal and transmitting said surround/second signal, as processed by said second audio amplifier, to said at least one second audio transducer.

17. A reproducing apparatus according to claim 13, further comprising:
a third intermediate audio switch, said third intermediate audio switch directing said surround/second signal to one of another audio transducer of said at least one first audio transducer and at least one second audio transducer.

18. A reproducing apparatus according to claim 1, further comprising:
a plurality of input video signal lines, an input video signal line of said plurality of input video signal lines supplying an input video signal;
a first input video switch, said first video switch receiving said plurality of input video signal lines, said first video switch selecting one of said plurality of input video signal lines as a first selected video signal, said first selected video signal being presented for display at said first location; and
a second input video switch, said second video switch receiving said plurality of input video signal lines, said second video switch selecting one of said plurality of input video signal lines as a second selected video signal, said second selected video signal being presented for display at said second location.

19. A reproducing apparatus according to claim 18, further comprising:
a system controller, said system controller controlling:
said first video switch to select said one of said plurality of input video signal lines as said first intermediate video signal; and
said second video switch to select said one of said plurality of input video signal lines as said second intermediate video signal.

20. A reproducing apparatus according to claim 19, further comprising:
at least one remote controller, said at least one remote controller controlling said system controller, said first and second video switches being controlled in response to a control signal from said at least one remote controller.

21. A reproducing apparatus according to claim 20, wherein said at least one remote controller is in said first location.

22. A reproducing apparatus according to claim 20, wherein said at least one remote controller is in said second location.

23. A reproducing apparatus according to claim 20, wherein one said at least one remote controller is in said first location and another said at least one remote controller is in said second location.

24. A reproducing apparatus according to claim 19, wherein said control signal is an infrared signal.

25. A reproducing apparatus according to claim 19, further comprising:
said system controller further controlling:
said first audio switch to select said one of said plurality of input audio signal lines as said first intermediate audio signal;
said second audio switch to select said one of said plurality of input audio signal lines as said second intermediate audio signal;
said second audio switch to select said one of said plurality of input audio signal lines as a second intermediate audio signal;
said first intermediate audio switch to select said one of said first intermediate audio signal and said input terminal signal as said first selected audio signal; and
said second intermediate audio switch to select said one of said second intermediate audio signal and said input terminal signal as said second selected audio signal.

* * * * *

UNITED STATES PATENT AND TRADEMARK OFFICE
CERTIFICATE OF CORRECTION

PATENT NO. : 6,430,353 B1
DATED : August 6, 2002
INVENTOR(S) : Susumu Honda

It is certified that error appears in the above-identified patent and that said Letters Patent is hereby corrected as shown below:

<u>Column 8,</u>
Line 42, delete "one" (first occurrene).

Signed and Sealed this

Twelfth Day of August, 2003

JAMES E. ROGAN
*Director of the United States Patent and Trademark Office*